US005559876A

United States Patent [19]

Alperovich

[11] Patent Number: 5,559,876
[45] Date of Patent: Sep. 24, 1996

[54] CONFERENCING CIRCUIT, AND ASSOCIATED METHOD, FOR AUTOMATICALLY CONFERENCING SUBSCRIBER UNITS TOGETHER IN A TELEPHONIC CONFERENCE

[75] Inventor: Vladimir Alperovich, Dallas, Tex.

[73] Assignee: Telefonaktiebolaget L M Ericsson (publ), Stockholm, Sweden

[21] Appl. No.: 523,086

[22] Filed: Sep. 1, 1995

[51] Int. Cl.[6] .............................. H04M 3/42; H04M 3/00
[52] U.S. Cl. ...................... 379/205; 379/204; 379/356
[58] Field of Search ............................. 379/92, 201, 202, 379/203, 204, 205, 206, 207, 216, 265, 266, 309, 355, 356; 370/62

[56] References Cited

U.S. PATENT DOCUMENTS

| | | | |
|---|---|---|---|
| Re. 31,534 | 3/1984 | Fenton et al. ...................... | 379/204 X |
| 3,660,610 | 5/1972 | Hestad et al. ...................... | 379/204 X |
| 3,792,202 | 2/1974 | Adams, Jr. et al. ................ | 379/205 X |
| 3,912,874 | 10/1975 | Botterell et al. ................... | 379/205 X |
| 4,424,418 | 1/1984 | Moore et al. ...................... | 379/204 |
| 4,475,189 | 10/1984 | Herr et al. ......................... | 370/62 |
| 4,631,364 | 12/1986 | Coyne et al. ...................... | 379/164 |
| 4,653,090 | 3/1987 | Hayden ............................. | 379/204 |
| 4,724,539 | 2/1988 | Hiskes .............................. | 379/205 |
| 4,893,335 | 1/1990 | Fuller et al. ...................... | 379/200 |
| 5,199,062 | 3/1993 | Von Meister et al. ............. | 379/67 |
| 5,463,685 | 10/1995 | Gaechter et al. .................. | 379/207 |

*Primary Examiner*—Jeffery Hofsass
*Assistant Examiner*—Harry S. Hong
*Attorney, Agent, or Firm*—Jenkens & Gilchrist P.C.; Robert H. Kelly

[57] ABSTRACT

Conferencing circuitry, and an associated method, for automatically conferencing together a plurality of subscriber units of a telephonic communications network. A list of directory numbers associated with the subscriber units to be conferenced together is stored in a memory device. When an initiating subscriber initiates formation of the telephonic conference, the initiating subscriber merely enters a conference code by way of an initiating subscriber unit. The conferencing circuitry detects the conferencing coded, and in response thereto automatically conferences together the subscriber units associated with the directory numbers of the accessed list.

18 Claims, 4 Drawing Sheets

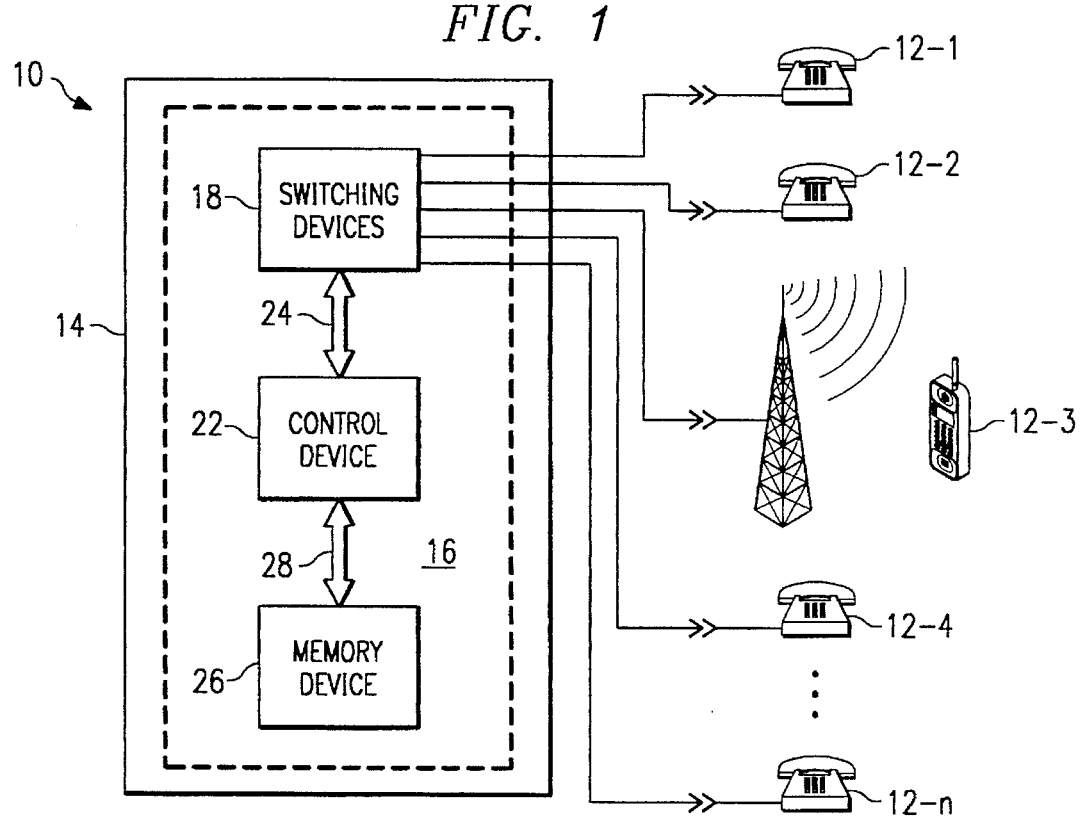

CONFERENCING CIRCUIT, AND ASSOCIATED METHOD, FOR AUTOMATICALLY CONFERENCING SUBSCRIBER UNITS TOGETHER IN A TELEPHONIC CONFERENCE

BACKGROUND OF THE INVENTION

1. Technical Field of the Inventor

The present invention relates generally to telephonic communication networks. More particularly, the present invention relates to a conferencing circuit, and an associated method, for automatically conferencing subscriber units of a telephonic communication network together in a common, conference connection.

2. Description of Related Art

Telephonic communication networks have been installed throughout significant portions of the world to permit telephonic communication thereupon. A subscriber to a telephonic communication network communicates telephonically by way of a subscriber unit, such as a conventional telephonic apparatus having a telephonic keypad and a telephonic handset. Both voice and data communication is permitted through the telephonic communication network.

A communication link is typically effectuated between subscriber units of the network when a subscriber positioned at a first subscriber unit enters a directory, or other identification number associated with a second subscriber unit. The directory number is routed by appropriate switches and such switches form a communication link between the first and second subscriber units when the second subscriber is taken "off-hook."

Many telephonic communication networks further permit conferencing between subscribers at more than two subscriber stations simultaneously. Once conferenced together, subscribers positioned at many varied locations are able to participate jointly in conversations.

Conferencing between several subscribers by way of a telephonic communication network permits group discussions or meetings to be conducted by telephone rather than in-person. The need otherwise to conduct a face-to-face meeting can oftentimes be obviated by instead conferencing together groups of people by way of a telephonic communication network. Accordingly, use of conferencing by way of a telephonic communication network is oftentimes a very cost-effective manner by which to conduct discussions or meetings.

Certain business personnel, for instance, make use of the conferencing capabilities of a telephonic communication network with regularity. In many instances, the same personnel are conferenced together periodically, sometimes weekly, and sometimes even daily. Technical coordination meetings and sales or management meetings are examples of business meetings which are sometimes conducted by conferencing together the same personnel.

Some telephonic communication networks provide subscribers thereto with a service referred to as "three-way calling." Through such a service, three separate subscribers to the communication network are conferenced together to permit joint conversations between the three subscribers.

To conference together the subscribers, a subscriber (the "initiating" or "calling" subscriber) subscribing to the three-way calling service first initiates formation of a communication link with a subscriber positioned at a second subscriber unit. The initiating subscriber can then add an additional subscriber to the existing two-party communication link. Typically, addition of the third subscriber to the two-party communication link, thereby to form a three-party communication link, is effectuated when the initiating subscriber momentarily depresses a telephonic switchhook and enters the directory number of the third subscriber. Once a communication link is effectuated between the initiating subscriber and the third subscriber, the initiating subscriber again momentarily depresses the switchhook to bridge the two separate communication links together, thereby to conference together the three subscribers.

In some telephonic communication networks, the assistance of an operator is required to conference together the subscribers, particularly when more than three subscribers are to be conferenced together. Even in networks which permit an initiating subscriber to initiate the conferencing together of more than three subscribers, the initiating subscriber is required to enter at least the directory numbers associated with each of the subscriber units at which the other subscribers are positioned each time in which conferencing is desired.

A manner by which a plurality of subscribers could be conferenced together without requiring operator intervention and without requiring an initiating subscriber repeatedly to input long series of input commands or directory numbers when conferencing together the same groups of subscribers would therefore be advantageous.

It is in light of this background information related to conferencing capabilities of telephonic communications network that the significant improvements of the present invention have evolved.

SUMMARY OF THE INVENTION

The present invention, accordingly, advantageously provides circuitry, and an associated method, for automatically conferencing together subscriber units of a telephonic communication network, thereby to permit telephonic conferencing.

The present invention further advantageously provides conferencing circuitry for a communications network switch, and a switch incorporating such conferencing circuitry, which can be utilized by a intra-LATA company or an inter-LATA company.

In one aspect of the present invention, an initiating subscriber initiates the conferencing together of a plurality of subscribers merely by the entry of a conferencing code at a subscriber unit at which the initiating subscriber is positioned. Responsive to detection of the entry of the conferencing code, the conferencing circuitry automatically initiates effectuation of communication links with selected subscriber units, thereby to conference together the selected subscriber units with the subscriber unit (the initiating subscriber unit) at which the initiating subscriber is positioned. The initiating subscriber is not required to enter a long series of digits at the initiating subscriber unit to initiate effectuation of communication links with each of the subscriber units which are to be conferenced together.

In another aspect of the present invention, the conferencing circuitry forms a portion of a communications network having a switch for selectively effectuating communication links between subscriber units connected to the network. Each of the subscriber units is identified by an identification number such as an subscriber directory number or a speed code representing a subscriber directory number. The conferencing circuitry conferences selected subscriber units together with a calling subscriber unit in a common communications link responsive to entry at the calling subscriber unit of a conferencing code. A memory device stores at least one list of identification numbers identifying the selected subscriber units to be conferenced together in the common communications link. A control device is operative responsive to detection of the entry of the conferencing code at the calling subscriber unit. The control device is coupled to the memory device for accessing a selected list of the at least one list stored at the memory device. The control device also implements effectuation of communication links between the subscriber units identified by the identification numbers of the selected list in the calling subscriber unit, thereby conferencing the selected subscriber units together with the calling subscriber unit.

In another aspect of the invention, a plurality of lists associated with the initiating subscriber unit are stored at the memory device. Responsive to entry by way of the initiating subscriber unit of the conferencing code, a prompt requesting further selection of one of the plurality of lists associated with the initiating subscriber unit is made. Responsive to the further selection of one of the lists, a control device initiates effectuation of communication links between the subscriber units identified by the numbers of the selected list and the initiating subscriber unit.

In still another aspect of the invention, the control device is operative further to create the list of identification numbers stored in the memory device. The list is created responsive to input of the identification numbers by way of the calling subscriber unit. Once the list is created and stored at the memory device, the list is accessed merely by entering the conferencing code, and, if more than one list associated with the calling subscriber unit is stored at the memory device, selection of one of the stored lists is further entered. The initiating subscriber need not request the intervention of an operator to effectuate the telephonic conference; the operator also need not enter long series of digits to effectuate the conference. Only a conferencing code and, if necessary, a selection of a particular list stored in memory, need be entered by the initiating subscriber to effectuate the telephonic conference.

In yet another aspect of the invention, a telephonic switch automatically conferences an initiating subscriber unit together with selected subscriber units in a common communications link. The conference is effectuated responsive to entry at the initiating subscriber unit of a conferencing code. Each of the selected subscriber units is identified by an identification number. Switch elements form the communication links with the initiating subscriber unit and with each of the selected subscriber units. A memory device stores at least one list of identification numbers identifying the selected subscriber units to be conferenced together in the common communications link. A control device is coupled to the switch elements and to the memory device. The control device is operative responsive to detection of the entry of the conferencing code at the initiating subscriber unit. The control device accesses a selected list of the at least one list stored at the .memory device and causes the switch elements to form the communication links with the selected subscriber units.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 1 is a partial, functional block and partial, schematic diagram of a telephonic communication network which includes an embodiment of the present invention.

FIG. 2 is an illustration of an exemplary arrangement of information stored in a memory device which forms a portion of the conferencing circuitry of an embodiment of the present invention.

DETAILED DESCRIPTION

Figure 3:
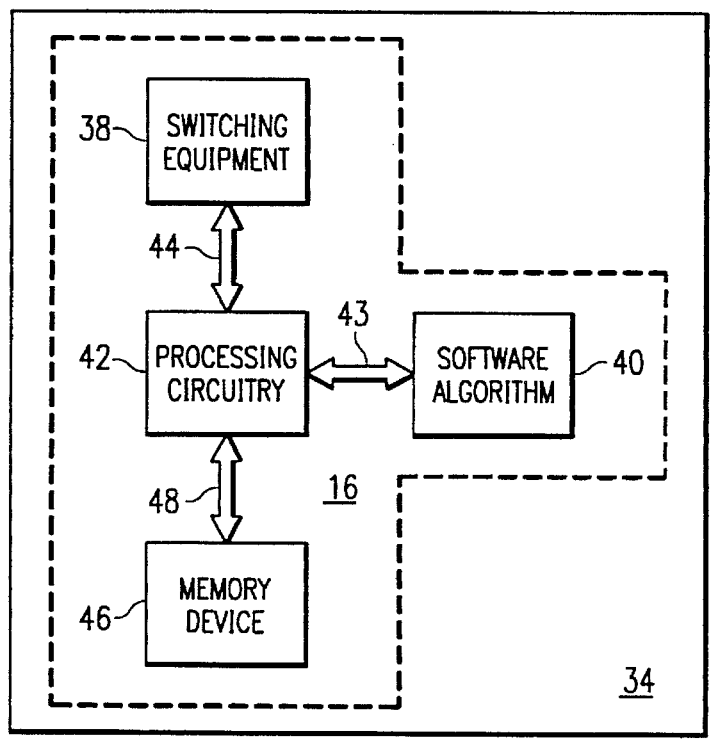
FIG. 3 is a functional block diagram of an exemplary switch of an embodiment of the present invention which includes conferencing circuitry to permit automatic conferencing together of a plurality of subscriber units.

FIG. 1 illustrates a communications network, shown generally at 10, which permits two-way communication between subscriber units 12 by way of a switch 14. Subscriber units 12-1, 12-2, 12-3, 12-4, and 12-n are shown. The subscriber unit 12-1 is pictured at the left-hand side (as shown) of the switch merely for purposes of illustration as, in the exemplary operation of the network 10 described below, the subscriber unit 12-1 forms an initiating subscriber unit which initiates conferencing together of others of the subscriber units. The subscriber unit 12-3 is shown to be a wireless subscriber unit to indicate that wireless subscriber units can be conferenced together during operation of the present invention in the same manner as that of conventional wireline subscriber units.

The switch 14 effectuates communication links between an "initiating" or "calling" subscriber unit and a "called" subscriber unit in conventional manner. As shall be described below, the switch 14 is further operative to automatically conference together a plurality of subscriber units to permit common communication therebetween. The conferencing together of the plurality of subscriber units is effectuated automatically, without repeatedly requiring input of long sequences of digits or commands to effectuate the conferencing together of the subscriber units.

The switch 14 includes conferencing circuitry 16 to permit the conferencing together of the plurality of subscriber units. Elements which comprise the circuitry 16 also perform other conventional switch functions. For purposes of simplicity, such additional functions are not described.

One skilled in the telecommunication field would realize that these elements of the circuitry 16 could be shared with other applications and devices. Switching devices 18 form portions of the conferencing circuitry 16. The switching devices 18 form the switched connections for connecting selected ones of the subscriber units 12 together to form communication links to permit communication between such selected subscriber units.

A control device 22 is coupled to the switching devices 18 by way of a bus 24. The control device 22 may consist of processing circuitry having executable software algorithms. Operation of the control device 22 controls switching of the switching devices 18 to cause effectuation of the communication links between the subscriber units 12.

The control device 22 is further coupled to a memory device 26 by way of a bus 28. Lists of directory, or other identification, numbers are stored in the memory device 26. The control device 22 accesses lists of the directory, or other identification, numbers stored in the memory device 26° Once a particular list of directory numbers is accessed, communication links are attempted to be effectuated with the subscriber units associated with such directory numbers. Upon effectuation of communication links with the subscriber units, a common connection is formed to conference together the subscriber units. The memory device 26 is preferably formed of a memory device which permits alteration or updating of information stored therein, such as a random access memory.

When a subscriber positioned at an initiating subscriber unit, such as the subscriber unit 12-1, desires to effectuate a communication link, (viz., place a call to) another subscriber unit, such as the subscriber unit 12-2, of the communications network 10, the communications link is effectuated in conventional manner. That is, the calling subscriber enters a directory number identifying the subscriber unit 12-2 by way of a keypad input terminal of the subscriber unit 12-1. The directory number input by way of the keypad of the subscriber unit 12-1 is identified by the control device 22. Responsive to such identification, the control device 22 causes operation of the switching devices 18 to initiate a call setup to the subscriber unit 12-2. The communication link between the subscriber units 12-1 and 12-2 is formed once the subscriber unit 12-2 is positioned off-hook responsive to the ringing signals. Call termination is also effectuated in conventional manner, responsive to positioning of either of the subscriber units in an on-hook position.

The conferencing circuitry also permits an initiating subscriber positioned at an initiating subscriber unit, again such as the subscriber unit 12-1, to conference together a plurality of other subscriber units, such as the subscriber units 12-2, 12-3, and 12-4. The initiating subscriber enters a conferencing code by way of the keypad of the initiating subscriber unit. Detection of entry of the conferencing code by the control device 22 causes the control device to initiate effectuation of conferencing together of the subscriber units 12-2, 12-3, and 12-4, the "selected" subscriber units, in a conference connection together with the calling subscriber unit 12-1.

More particularly, upon detection of entry of the conferencing code at the subscriber unit 12-1, the control device 22 accesses a previously-stored list of identification numbers stored at the memory device 26. The list of stored identification numbers is associated with the subscriber entering the conferencing code or with the subscriber unit at which the conferencing code is entered. Once the list is accessed, the directory numbers forming the list are utilized by the control device 22 to initiate a call setup thereby generating a ringing signal to the selected subscriber units. Subscribers positioned at the selected subscriber units take their respective subscriber units off-hook responsive to the ringing signals. As the subscriber units are taken off-hook, the subscriber units are added to, or form, a conferenced connection together with the initiating subscriber unit.

Once a list of directory numbers associated with a particular subscriber or a particular subscriber unit has been stored in the memory device 26, entry of an appropriate conferencing code by way of a calling subscriber unit permits the control device 22 of the conferencing circuitry 16 to access a stored list. Generation and transmission of ringing signals to the subscriber units associated with the directory numbers of the list accessed by the control device 22 provides indications to subscribers positioned at the subscriber units to take their respective subscriber units off-hook. When taken off-hook, the switching devices 18 conference the selected subscriber units together with the initiating subscriber unit 12-1.

In one embodiment of the present invention, when any one of the subscriber units to which ringing signals are transmitted goes off-hook, the switching devices 18 are caused to form a communication link between the initiating subscriber unit 12-1 and such "answering" subscriber unit. As additional ones of the selected subscriber units go off-hook, the control device 22 causes an intrusion tone, such as a "beeping" sound to be generated to indicate the connection of another subscriber unit to the conference.

The control device 22 is further preferably also operative to maintain a record of the status of the subscriber units to be conferenced together. As ringing signals are transmitted to various of the subscriber units, the control device 22 updates records to indicate transmission of ringing signals. As subscriber units go off-hook and on-hook, the control device 22 similarly updates the records to indicate such activity. The initiating subscriber can access the stored records by a request entered by way of, for example, the keypad of a subscriber unit or by momentarily depressing the hook switch of the subscriber unit and thereafter entering the appropriate service code.

If, once the subscriber units are conferenced together, the initiating subscriber wishes to conference in an additional subscriber located at an additional subscriber unit, the initiating subscriber can enter the directory number of the additional subscriber unit in conventional fashion to conference together the additional subscriber unit in the common, conference connection already created with the other, selected subscriber units.

When the initiating subscriber wishes to terminate the conference, the initiating subscriber merely places the initiating subscriber unit in an on-hook position. By returning any of the selected subscriber units to an on-hook position, that particular subscriber unit is taken out of the conference without affecting the conferencing of any of the other subscriber units still connected in the common communications link.

FIG. 2 illustrates the manner by which information is indexed in the memory device 26. As described above, lists of directory numbers associated with subscriber units which are frequently conferenced together are stored in the memory device. Once the list is created and stored in the memory device 26, when conferencing together of the subscriber units is requested, the control device 22 of the conferencing circuitry 16 shown in FIG. 1 automatically causes effectuation of the communication link with the selected subscriber units.

In the exemplary illustration of FIG. 2, a number of lists are created for "Subscriber No. 1." Each of the lists include a series of identification numbers, here directory numbers, which are associated with selected subscriber units. The subscriber units associated with the directory numbers are conferenced together when the list is accessed responsive to a request entered by an initiating subscriber by way of an initiating subscriber unit. A plurality of lists are created for the first subscriber, and an additional selection of a particular one of the lists is also required. When the first subscriber enters a conferencing code, the control device 22 causes the subscriber to be prompted to select which of the lists are to be accessed. The subscriber selects a particular one of the lists to be accessed. Once the desired list is selected, conferencing of the subscriber units identified by the directory numbers of the selected list together with the subscriber unit at which the first subscriber is positioned is effectuated.

The second subscriber, "Subscriber No. 2", in the exemplary illustration of FIG. 2, has only one list of identification numbers stored in the memory device 26. The nth subscriber similarly has only one list of identification numbers stored in the memory device.

When, for instance, the second subscriber enters a conferencing code, the control device 22 accesses the list associated with the second subscriber, and the subscriber units associated with the directory numbers of the list are conferenced together in the manners described previously. Similarly, when the nth subscriber enters a conferencing code, the list associated therewith is accessed, and the subscriber units associated with the directory numbers stored in such lists are conferenced together with the subscriber unit at which the nth subscriber is positioned.

FIG. 3 illustrates an AXE(TM) switch 34 which embodies the conferencing circuitry 16 of an embodiment of the present invention. The AXE switch is a switch manufactured and marketed by Telefonaktiebolaget LM Ericsson, the assignee herein. The AXE switch 34 is exemplary of a switch capable of incorporating the conferencing circuitry 16 of an embodiment of the present invention. It should be noted, though, that other switches may analogously be constructed to include the teachings of the present invention.

As illustrated, the conferencing circuitry 16 forming a portion of the switch 34 includes switching equipment 38, analogous to the switching devices 18 forming a portion of the conferencing circuitry 16 shown in FIG. 1. Analogous to the control device 22, the conferencing circuitry 16 of the AXE switch 34 includes software algorithms 40 and processing circuitry 42. The processing circuitry 42 executes the algorithms 40 during operation of the circuitry 16. The processing circuitry 42 accesses the software algorithms 40 by way of the lines 43. Execution of software algorithms 40 by the processing circuitry 42 effectuates the functions performed by the control device 22 shown in FIG. 1.

The conferencing circuitry further includes a memory device 46, analogous to memory device 26 shown in FIG. 1. Lists of directory, or other identification, numbers are stored in the memory device 46. Lines 48 connect the processing circuitry 42 together with the memory device 46. When an initiating subscriber enters a conferencing code, algorithms executable by the processing circuitry identify the code, and initiate accessing of an appropriate list of directory numbers stored in the memory device 46.

Conferencing together of the selected subscriber units identified by the directory numbers is effectuated in the manner described with respect to operation of the conferencing circuitry 16 described previously. In the illustrated embodiment in which the conferencing circuitry forms a portion of an AXE(TM) switch 34, the software algorithms 40, when executed, perform the functions of the conferencing circuitry. As one familiar with the operation of an AXE switch is aware, the switch includes a feature manager and feature units. The software algorithms 40 of the AXE switch 34 are formed of such feature units.

Figure 4:
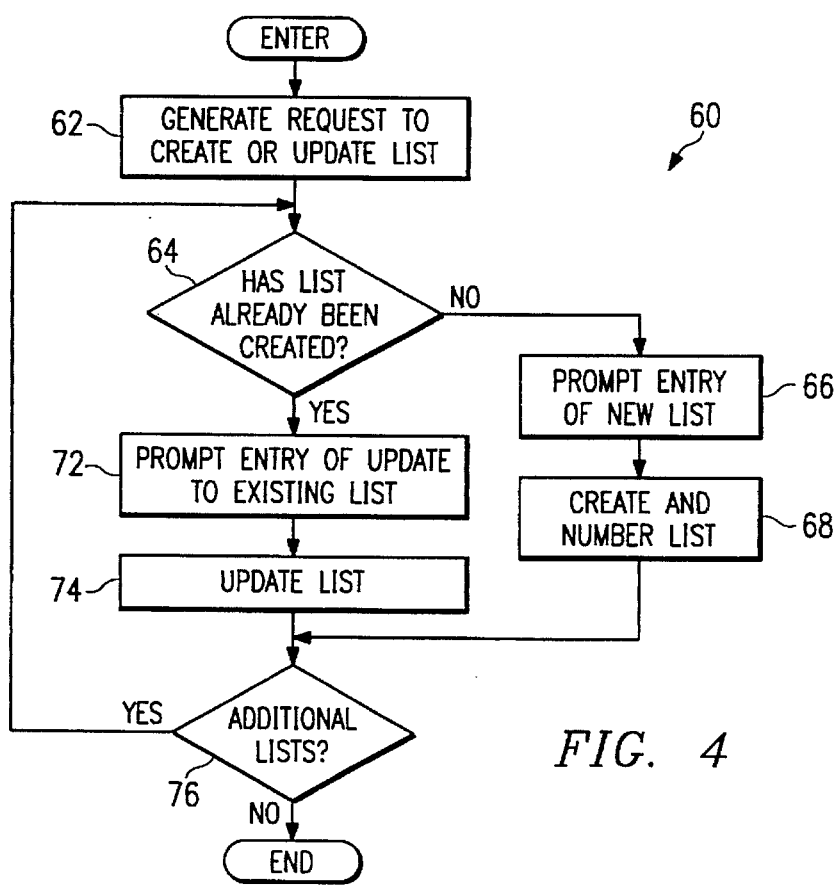
FIG. 4 is a flow diagram illustrating operation of the conferencing circuitry of an embodiment of the present invention to create, or update, lists of directory numbers stored in a memory device forming a portion of the conferencing circuitry of an embodiment of the present invention.

FIG. 4 illustrates a flow diagram, shown generally at 60, representative of operation of the conferencing circuitry 16 to create or update lists of identification numbers in the memory device, such as the memory devices 26 and 46 shown in FIGS. 1 and 3, respectively.

When a subscriber wishes to create or update a list of identification numbers, a request, as indicated by the block 62, is first generated. Responsive to the request, a determination, indicated by the decision block 64, is made as to whether a list has previously been created and stored by the subscriber. If not, the no (N) branch is taken to block 66 and the subscriber is prompted to create a list for storage in the memory device. Preferably, a series of prompts are generated to prompt the subscriber to enter the list of directory numbers by way of a keypad of a subscriber unit through which the subscriber initiates the request. Entry of inputs generated by the subscriber cause one or more lists to be created, as indicated by the block 68.

If a list has already been created and stored in the memory device, the yes (Y) branch is taken from the decision block 64, and the subscriber is prompted, as indicated by the block 72, to make updates to an existing list. Responsive to such inputs, and as indicated by the block 74, the list is updated responsive to an entry at the calling subscriber unit of the updated data.

Once the list has been created or updated, a determination, indicated by the decision block 76, is made as to whether additional lists are to be updated or created. If not, the no (N) branch is taken to the end of block 78. Otherwise, the yes (Y) branch is taken back to the decision block 64, and additional lists can be created or updated.

Figure 5:
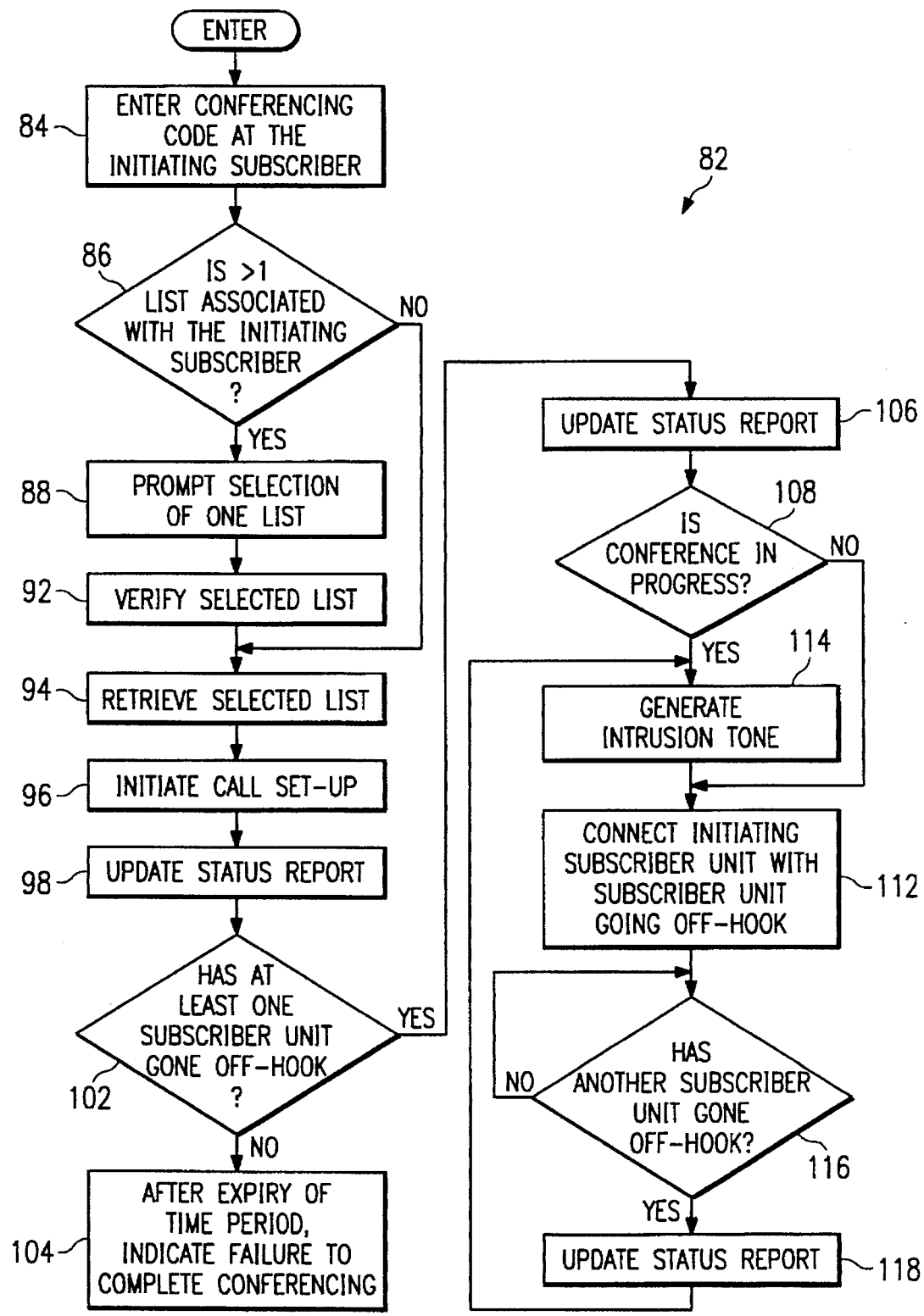
FIG. 5 is a flow diagram illustrating operation of the conferencing circuitry of an embodiment of the present invention to conference selected subscriber units together with an initiating subscriber unit to permit common communication therebetween.

FIG. 5 illustrates a flow diagram, shown generally at 82, representative of operation of the conferencing circuitry 16 to conference a plurality of subscriber units together with an initiating subscriber unit.

A subscriber desiring to initiate a telephonic conference with subscribers positioned at plurality of other subscriber units, enters a conferencing code, as indicated by the block 84, at an initiating subscriber station.

When, and as indicated by the decision block 86, a determination is made as to whether more than one list is associated with the initiating subscriber. If more than one list is associated with the initiating subscriber, the yes (Y) branch is taken and the initiating subscriber is prompted, as indicated by the block 88, to select a single list. Then, and as indicated by the block 92, the selection entered by the calling subscriber is validated. Once validated, and as indicated by the block 94, the directory numbers of the selected list are retrieved. If only one list is associated with the initiating subscriber, the no (N) branch is taken from the decision block 86 to the block 94.

Once the list of directory numbers has been retrieved, an attempt, as indicated by the block 96, is made to effectuate communication links with the subscriber units associated with the retrieved, directory numbers. Call setup is initiated for each directory number thereafter generating ringing signals for a successful setup. As the ringing signals are generated, and as indicated by the block 98, a status report is updated.

Thereafter, and as indicated by the decision block 102, a determination is made as to whether at least one subscriber unit of the subscriber units associated with the directory numbers of the accessed list has gone off-hook. If not, the no (N) branch is taken to block 104 whereat, after the expiration of a selected time period, a failure to effectuate the conference is indicated to the initiating subscriber. In a further embodiment, one or more attempts to effectuate the telephonic conferencing are made prior to indicating the failure to complete the telephonic conference.

If at least one of the subscriber units has gone off-hook, the yes (Y) branch is taken from the decision block 102 to the block 106 where the status report information is updated.

Thereafter, and as indicated by the decision block 108, a determination is made as to whether telephonic conferencing is already in progress. That is to say, a determination is made as to whether a communication link has already been effectuated between the calling subscriber unit and at least one of the selected subscriber units associated with the directory numbers of the accessed list.

If not, the no (N) branch is taken to block 112 and a communication link is effectuated between the calling subscriber unit and the subscriber unit going off-hook. If, conversely, a telephonic conference is already in progress, the yes (Y) branch is taken from the decision block 108 to the block 114, and an intrusion tone is generated. As mentioned previously, the intrusion tone may be formed of a "beeping" sound to indicate the addition of another subscriber unit to the already-existing telephonic conference, such addition indicated by the block 112.

Thereafter, and as indicated by the decision block 116, a determination is made as to whether any additional subscriber units have gone off-hook. If not, the no (N) branch is taken and the determination is repeated. When an additional subscriber unit is determined to have gone off-hook, the yes (Y) branch is taken from the decision block 116 to the block 118 whereat the status report is updated. Thereafter, a loop is taken back to the block 114.

Figure 6:
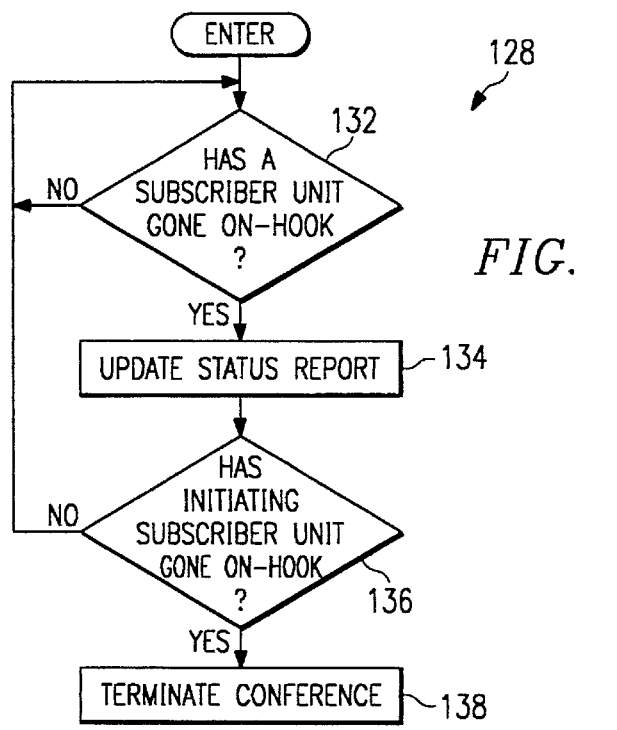
FIG. 6 is a flow diagram illustrating operation of the conferencing circuitry of an embodiment of the present invention to terminate conferencing of subscriber units conferenced together in a common connection.

FIG. 6 illustrates a flow diagram, shown generally at 128, of a call termination routine to update the report of the status of the subscriber units conferenced together and to terminate the telephonic conference.

First, and as indicated by the decision block 132, a determination is made as to whether a subscriber unit has gone on-hook. If not, a no (N) branch is taken from the decision block 132 and the determination is repeated. If, conversely, any of the selected subscriber units has gone on-hook, the status report is updated, as indicated by the block 134. When any of these selected subscriber units goes on-hook, communication with that particular subscriber unit is terminated, but communication with remaining ones of the subscriber units is unaffected.

A determination is made, as indicated by the decision block 136, as to whether the initiating subscriber unit has gone on-hook. If not, the no (N) branch is taken back to the decision block 132. If, however, the initiating subscriber unit has gone on-hook, the yes (Y) branch is taken and the telephonic conference is terminated, as indicated by the block 138. That is to say, when the initiating subscriber unit goes on-hook, the telephonic conference is terminated, whereas, if any of the other subscriber units coupled in the telephonic conference goes on-hook, the telephonic conference with remaining ones of the subscriber units remains unaffected.

While the flow diagrams illustrated in FIGS. 4–6 are particularly amenable to software implementation to be executed by processing circuitry, such as the processing circuitry 42 forming a portion of the conferencing circuitry 16 of the AXE switch 34 (FIG. 3), other types of circuitry can be utilized to implement the operation of the conferencing circuitry described by the flow diagrams.

Figure 7:
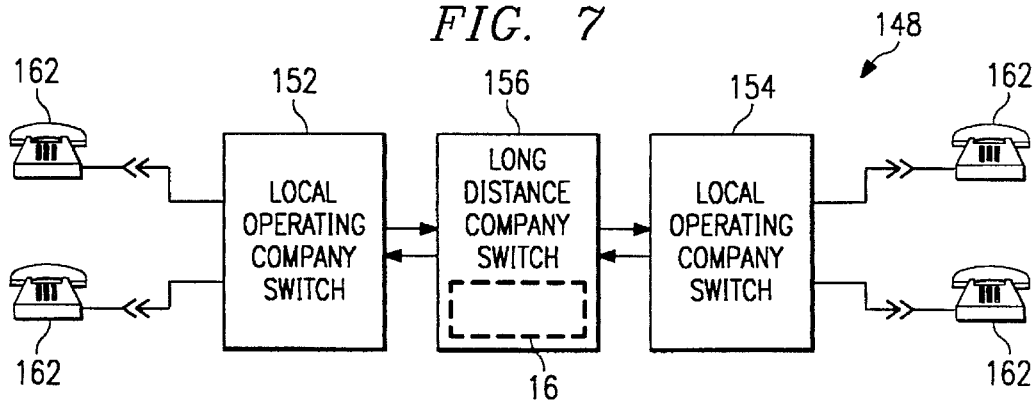
FIG. 7 is a block diagram of a communications network in which the switch of an embodiment of the present invention is operated by an inter-LATA carrier.

FIG. 7 illustrates a communications network, shown generally at 148, formed of local operating company switches 152 and 154 and a long distance company switch 156 which connects the switches 152 and 154. The local operating company switches 152 and 154 are sometimes referred to as intra-LATA switches as the switches 152 and 154 form portions of LATA carriers. The long distance company switch 156 is sometimes referred to as being an inter-LATA switch as the long distance carrier and the long distance company switch interconnects to LATA carriers, here represented by the switches 152 and 154.

Subscriber units 162 are coupled to the switches 152 and 154 in conventional manner. The conferencing circuitry 16 forms a portion of the long distance company switch 156 in the embodiment illustrated in FIG. 7. When an initiating subscriber enters a conferencing code by way of an initiating subscriber station, the conferencing code is interpreted by a local operating company switch and forwarded on to the long distance company switch 156. As described previously, a list of directory numbers stored in a memory device is accessed, and communication links are effectuated with the subscriber units associated with the directory numbers of the accessed list. The directory numbers may be associated with subscriber units coupled to any of the switches. A benefit of implementing the conferencing circuitry in the long distance company switch is to reduce the access charge by a subscriber 162 to the long distance company switch 156. Since the long distance company switch 156 is initiating the call setup, a subscriber 162, who is physically connected to the local operating company switch 152, would only be charged once for the access to the long distance company switch 156.

Figure 8:
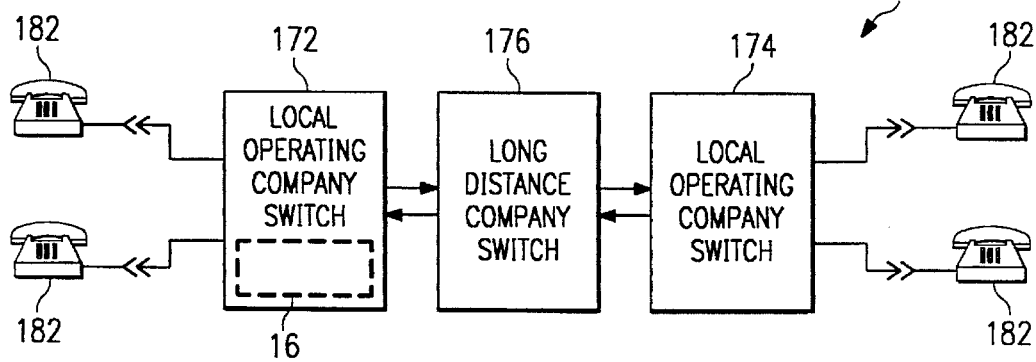
FIG. 8 is a block diagram of a communications network, similar to that shown in FIG. 7, but wherein the switch of an embodiment of the present invention is operated by an intra-LATA carrier.

FIG. 8 illustrates a communications network, shown generally at 168, which, similar to the communications network 148 shown in FIG. 7, is formed of local operating company switches 172 and 174. The local operating company switches 172 and 174 are interconnected by way of a long distance company switch 176. Again, subscriber units, here subscriber units 182, are coupled to the local operating company switches 172 and 174 in conventional manner.

The communications network 168 differs with that of the communications network 148 in that the conferencing circuitry 16 is positioned at a local operating company switch, switch 172. An initiating subscriber designed to conference together a plurality of subscriber stations enters a conference code by way of an initiating subscriber unit. The conferencing code is detected by the conferencing circuitry 16 of the switch 172. The conferencing circuitry 16 attempts to effectuate the conferencing together of a plurality of subscriber units identified by a list accessed in a memory device forming a portion of the circuitry 16.

Examination of FIGS. 7 and 8 indicates that the conferencing circuitry 16 may form portions of any switch of a telephonic communications network to facilitate conferencing together of a plurality of subscriber units in a common communications link.

By storing the directory numbers associated with subscriber units which are to be conferenced together, conferencing of the subscriber units together can be effectuated automatically, merely by entry of a conference code by an initiating subscriber. Intervention by an operator or the need to enter long sequences of digits each time in which the same group of subscriber units are to be conferenced together is obviated. Because the conferencing circuitry can form portions of either a switch of a local operating company or a long distance company, either of such companies can utilize the conferencing circuitry.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

I claim:

1. In a communications network having a switch for selectively effectuating communication links between subscriber units connected to the network, the subscriber units each identified by an identification number, conferencing circuitry for conferencing selected subscriber units together with an initiating subscriber unit in a common communications link responsive to entry at the initiating subscriber unit of a conferencing code, said conferencing circuitry comprising:

a memory device for storing at least one list of identification numbers identifying the selected subscriber units to be conferenced together in the common communications link;

a control device operative responsive to detection of the entry of the conferencing code at the initiating subscriber unit, said control device coupled to said memory device for accessing a selected list of said at least one list stored at said memory device and for implementing effectuation of communication links between the subscriber units identified by the identification numbers of the selected list and the initiating subscriber unit, thereby conferencing the selected subscriber units together with the initiating subscriber unit; and said control device further operative, responsive to a prompt by the initiating subscriber unit, to provide indications of to which subscriber units of the selected subscriber units communication links have been effectuated.

2. The conferencing circuitry of claim 1 wherein said memory device comprises a random access memory device and wherein the identification numbers forming the at least one list are entered for storage in said memory device by way of the initiating subscriber unit.

3. The conferencing circuitry of claim 1 wherein the at least one list of identification numbers comprises a plurality of lists, each list of said plurality of lists associated with a particular initiating subscriber unit.

4. The conferencing circuitry of claim 3 wherein at least two lists of said plurality of lists are associated with the initiating subscriber unit.

5. The conferencing circuitry of claim 4 wherein said control device is further operative to prompt entry at the initiating subscriber unit of selection of one of the at least two lists associated with the initiating subscriber unit and to access the one of the at least two lists responsive to selection thereof.

6. The conferencing circuitry of claim 1 wherein said control device comprises processing circuitry having algorithms executable therein for accessing the selected list and for implementing the effectuation of the communication links.

7. The conferencing circuitry of claim 1 wherein said control device is further operative to provide indications when communication links with the subscriber units identified by the identification number are effectuated.

8. The conferencing circuitry of claim 1 wherein said control device is further operative to provide indications of times when communication links with the subscriber units identified by the identification numbers are unable to be effectuated.

9. The conferencing circuitry of claim 8 wherein said control device is further operative to reattempt effectuation of communication links with the subscriber units subsequent to times in which communication links are unable to be effectuated.

10. The conferencing circuitry of claim 1 wherein said control device is further operative to create the at least one list of identification numbers stored in said memory device responsive to input of the identification numbers by way of the initiating subscriber unit.

11. The conferencing circuitry of claim 1 wherein said control device is further operative to edit the at least one list of identification numbers stored in said memory device responsive to editing commands input by way of the initiating subscriber unit.

12. The conferencing circuitry of claim 1 wherein the control device includes interactive announcement means for generating announcements responsive to inputs input by way of the initiating subscriber unit.

13. The conferencing circuitry of claim 1 wherein said control device is further operative to terminate conferencing of the selected subscriber units together with the initiating subscriber unit responsive to a conferencing termination command input by way of the initiating subscriber unit.

14. A method for conferencing selected subscriber units together with an initiating subscriber unit in a common communication link responsive to entry by an initiating subscriber at the initiating subscriber unit of a conferencing code, said method comprising the steps of:

storing at least one list of identification numbers identifying the selected subscriber units to be conferenced together in the common communications link;

accessing a selected list of said at least one list stored during said step of storing responsive to entry of the conferencing code at the initiating subscriber unit;

transmitting ringing signals to the selected subscriber units to implement effectuation of communication links between the subscriber units identified by the identification numbers of the selected list and the initiating subscriber unit, thereby conferencing the selected subscriber units together with the initiating subscriber unit as the selected subscriber units are taken off-hook;

updating records associated with the selected subscriber units to which the ringing signals are transmitted during said step of transmitting to indicate which of the selected subscriber units are taken off-hook responsive thereto; and selectively accessing the records updated during said step of updating to provide the initiating subscriber with indications of which of the selected subscriber units are conferenced together with the initiating subscriber unit.

15. Conferencing circuitry for conferencing selected subscriber units together with a calling subscriber unit in a common communication link responsive to entry at the calling subscriber unit of a conferencing code, said conferencing circuitry comprising:

means for storing at least one list of identification numbers identifying the selected subscriber units to be conferenced together in the common communications link;

means for accessing a selected list of said at least one list stored at said memory device, said means for accessing coupled to said means for storing;

means for transmitting ringing signals to the selected subscriber units to implement effectuation of communication links between the subscriber units identified by the identification numbers of the selected list and the calling subscriber unit, thereby to conference the selected subscriber units together with the calling subscriber, said means for transmitting coupled to said means for storing and operative responsive to detection of the entry of the conferencing code at the calling subscriber unit;

means for updating records associated with the selected subscriber units to which the ringing signals are transmitted by said means for transmitting, thereby to indicate which of the selected subscriber units are taken off-hook responsive thereto; and means for selectively accessing the records updated by said means for updating, thereby to provide the calling subscriber with indications of which of the selected subscriber units are conferenced together with the calling subscriber unit.

16. A telephonic switch for automatically conferencing an initiating subscriber unit together with selected subscriber units in a common communications link responsive to entry by an initiating subscriber at the initiating subscriber unit of a conferencing code, each of the selected subscriber units identified by an identification number, said switch comprising:

switch elements for forming communication links with the initiating subscriber unit and each of the selected subscriber units;

a memory device for storing at least one list of identification numbers identifying the selected subscriber units to be conferenced together in the common communications link; and a control device coupled to said switch elements and to said memory device, said control device operative responsive to detection of the entry of the conferencing code at the initiating subscriber unit for accessing a selected list of said at least one list stored at said memory device for transmitting ringing signals to the selected subscriber units to implement effectuation by said switch elements of the communication links with the selected subscriber units, for updating records associated with the selected subscriber units to indicate which of the selected subscriber units are taken off-hook, and for selectively permitting access to the records to provide the initiating subscriber with indications of which of the selected subscriber units are conferenced together with the initiating subscriber unit.

17. The telephonic switch of claim 16 wherein said switch elements, said memory device, and said control device form an inter-LATA switch.

18. The telephonic device of claim 16 wherein said switch elements, said memory device, and said control device form an intra-LATA switch.

* * * * *